United States Patent [19]

Behrens

[11] Patent Number: 4,715,747

[45] Date of Patent: Dec. 29, 1987

[54] AIR MOTIVATED CONDUIT PROVER APPARATUS

[76] Inventor: Robert N. Behrens, 4802 W. Laurel La., Glendale, Ariz. 85304

[21] Appl. No.: 876,413

[22] Filed: Jun. 20, 1986

[51] Int. Cl.$^4$ .............................................. F16L 1/00
[52] U.S. Cl. ................................. 405/303; 15/104.05; 134/22.11; 138/97; 254/134.4; 405/154
[58] Field of Search ............... 405/154, 170, 171, 303, 405/184; 138/97; 134/22.11; 15/104.5, 104.6, 104.01 R; 254/134.4

[56] References Cited

U.S. PATENT DOCUMENTS

| | | | |
|---|---|---|---|
| 2,980,399 | 4/1961 | Littlefield | 254/134.4 |
| 3,107,379 | 10/1963 | Hill | 254/134.4 X |
| 3,495,546 | 2/1970 | Brown et al. | 254/134.4 X |
| 4,030,702 | 6/1977 | Ware et al. | 254/134.4 |
| 4,185,809 | 1/1980 | Jonnes | 254/134.4 |
| 4,465,220 | 8/1984 | Ledlow et al. | 254/134.4 X |
| 4,498,659 | 2/1985 | Brockelsby | 254/134.4 |

*Primary Examiner*—Dennis L. Taylor
*Attorney, Agent, or Firm*—H. Gordon Shields

[57] ABSTRACT

Air motivated apparatus for proving the integrity of a conduit includes a flexible cone of substantially the same diameter as the conduit which it is to prove secured to a flexible mandrel having a plurality of elements of different sizes, each element of which has a diameter at least slightly less than the diameter of the conduit, and a cap to seal the conduit and through which air is introduced to move the cone and its mandrel through the conduit. A flexible element, such as cable or rope, is secured to the mandrel and extends through the cap. The cable is used to retrieve the cone and the mandrel or to pull other objects, such as wires, etc., through the conduit.

11 Claims, 4 Drawing Figures

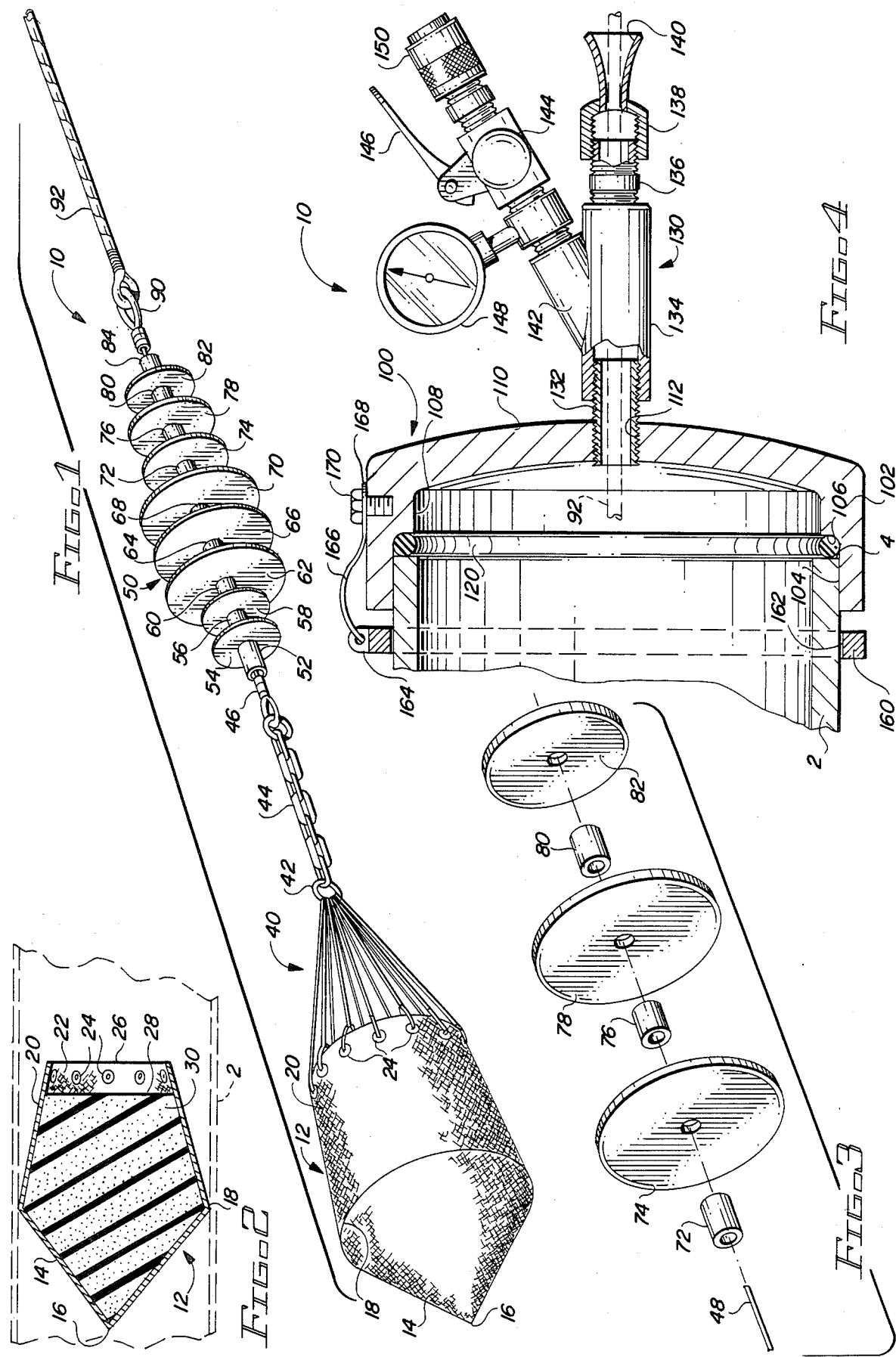

AIR MOTIVATED CONDUIT PROVER APPARATUS

BACKGROUND OF THE INVENTION

1. Field of the Invention

This invention relates to conduit prover apparatus and, more particularly, to air motivated or driven apparatus for proving the integrity of a conduit.

2. Description of the Prior Art

After a conduit has been laid, the integrity of the conduit must be proved before the trench, or the like, in which the conduit is disposed, may be backfilled. The integrity of the conduit is generally proven by moving or forcing a "fish line" through the conduit. The "fish line" is generally a length of relatively small and lightweight string, nylon filament, etc. The lightweight line is able to pass obstructions which may be in the pipe or conduit, such as rocks, dirt, or other debris which may result from the installation or laying of the conduit. The fish line is relatively light in weight and is extremely flexible so that breaks in the conduit, if any, will not affect it.

After the initial fish line is passed through the conduit, the line is then used to pull heavier line through the conduit or pipe, and the heavier, stronger line is in turn used to pull through yet heavier line, if necessary. Eventually, line of desired size and strength extends fully through the conduit. An appropriate mandrel is then secured to the heavy, strong line. The mandrel is then pulled through the conduit to prove the integrity of the conduit.

The mandrel is typically a relatively flexible disc or the like which is mechanically pulled through the conduit. Typically, several different mandrels are passed through the conduit, with the mandrels increasing in size from small to the large. The smallest mandrel is pulled through the conduit, and, if it moves through easily, a mandrel of slightly larger diameter is pulled through. This procedure continues until a mandrel of a diameter slightly less than the diameter of the conduit is pulled through. The different sized mandrels allow objects of different sizes to be cleaned from the pipe so that not only the physical integrity of the pipe is proven, but also the cleanliness aspect of the integrity of the pipe is also assured. If there are any breaks in the pipe, such breaks will be detected by the inability of the mandrel to pass through the pipe. The specific location of such break, or large obstruction, may be easily determined by measuring the distance that the mandrel has moved.

Using the apparatus of the prior art, it is obvious that proving the integrity of a conduit is a relatively time-consuming process, requiring substantial manpower for relatively long periods of time. With the apparatus of the present invention, the structural integrity of a conduit is proved at the same time that the conduit is cleaned of all debris. Since several operations are accomplished at one time, a substantial savings in labor and effort is effected. At the same time, the mandrel is able to be secured to a relatively large cable or line so that the pulling line or cable moves through the conduit at the same time that the conduit's integrity is proven. Again, there is a savings in time, and the time savings translates into a savings of manpower and equipment.

SUMMARY OF THE INVENTION

The invention described and claimed herein comprises a flexible cone secured to a mandrel having a plurality of discs spaced apart from each other and varying in diameter from substantially less in diameter than the diameter of the conduit to slightly less in diameter than the diameter of the conduit. The cone and mandrel are driven through the conduit by air pressure introduced into the conduit by a cap secured to the end of the conduit. The cable extends through the cap and is fed through the cap as the cone and mandrel are moved through the conduit.

Among the objects of the present invention are the following:

To provide new and useful apparatus for proving the integrity of a conduit;

To provide new and useful apparatus pneumatically moved through a conduit;

To provide new and useful air driven cone apparatus for proving the integrity of conduit;

To provide new and useful apparatus for cleaning a pipe;

To provide new and useful cap apparatus for introducing pressurized air into a conduit;

To provide new and useful apparatus for proving the integrity of a conduit including a cone moved through a conduit by air and a cap for closing an end of a conduit and for introducing air into the conduit to move the conduit;

To provide new and useful apparatus for proving the integrity of a conduit including a cone movable through a conduit, a mandrel secured to the cone, and a cable secured to the mandrel, all movable through the conduit by pneumatic pressure; and To provide new and useful air motivated apparatus movable through a conduit with a cap through which air is introduced into the conduit, is secured to the conduit, and a safety ring is disposed about the conduit and is secured to the cap.

BRIEF DESCRIPTION OF THE DRAWING

FIG. 1 is a perspective view of a portion of the apparatus of the present invention.

FIG. 2 is a view in partial section of a portion of the apparatus of the present invention.

FIG. 3 is an exploded perspective view of a portion of the apparatus of the present invention.

FIG. 4 is a side view in partial section of a portion of the apparatus of the present invention.

DESCRIPTION OF THE PREFERRED EMBODIMENT

FIG. 1 is a perspective view of a portion of conduit proving apparatus 10 of the present invention. The portion of the conduit apparatus 10 illustrated in FIG. 1 includes a cone 12, a mandrel assembly 50, and their related elements. The cone 12 is shown in partial section in FIG. 2 disposed within a pipe or conduit 2, with the pipe or conduit 2 illustrated in phantom.

FIG. 3 is an exploded perspective view of a portion of the mandrel assembly 50. In FIG. 1, a cable or rope 92 is shown secured to the mandrel assembly 50. In FIG. 4, the cable or rope 92 is shown extending through an end cap 100, and the end cap 100 is in turn secured to an end 4 of the conduit or pipe 2. A pneumatic and cable fitting 130 is in turn secured to the end cap 100. The conduit or pipe 2, the end cap 100, and a portion of the pneumatic and cable fitting 130 is shown in partial section in FIG. 4. A safety ring 160 is shown disposed on the conduit 2. For the following discussion of the conduit prover apparatus, reference will be made to FIGS. 1, 2, 3, and 4.

The cone 12 is the lead element of the conduit prover apparatus 10. That is, the cone 12 extends into, or is disposed within, the pipe or conduit 2 to be proved, and the mandrel assembly 50 is in turn secured to the cone 12. With both the cone 12 and the mandrel assembly 50 disposed within the pipe or conduit 2, the safety ring 170 is placed on the conduit and the end cap 100 is then secured to the end 4 of the conduit 2. The safety ring 170 is secured to the cap 100. Pneumatic (air) pressure from the pneumatic and cable fitting 130 causes a pressure buildup behind the conduit prover apparatus 10, and particularly behind the cone 12, to cause the cone 12 and the mandrel assembly 50 to pull the cable or rope 92 through the conduit 2.

The cone 12 includes two primary portions, a forward conical portion 14 and a rear tapered portion 20. The forward portion 14 includes a tip 16. As may be best understood from FIG. 2, the tip 16 is located on the central or longitudinal axis of the cone 12. Dividing the forward portion 14 from the rear portion 20 is a maximum diameter portion or area 18.

From the tip 16, the diameter of the cone 12 increases rearwardly to the maximum diameter area 18. Rearwardly of the maximum diameter 18, the cone tapers inwardly in diameter and terminates in a trailing edge 26. The trailing edge 26 is a circular area or portion which is substantially perpendicular to the longitudinal axis of the cone 12. It will be noted that the tapering of the diameter of the rear portion 20 is substantially less than the tapering of the forward conical portion 14. Accordingly, the overall diameter of the trailing edge 26 is less than the maximum diameter area 18, but is still relatively large.

The rear portion 20 includes a skirt 22. The skirt 22 extends rearwardly from a rear end wall 28. The rear end wall 28 comprises a rear end wall for the cone 12, and foam filling 30 is disposed within the closed portion of the cone. The closed portion of the cone is defined as being within the forward portion 14 and within the rear portion 20 forwardly of the rear end wall 28.

A plurality of eyelets 24 extend through the periphery of the skirt 22. As shown in FIG. 1, cord or rope elements 40 are secured to the eyelets 24. The cord or rope elements 40 extend from the eyelets 24 of the skirt 22 to a ring 42.

The foam filling 30 within the cone 12 is spongy, and accordingly the cone 12 will distort from a maximum diameter to a relatively finite, predetermined diameter so that a single cone 12 will fit various sized conduits. However, obviously a number of different generally sized, or variable sized, cone elements 12 will be required, depending on the particular size of a conduit or pipe to be proved. Thus, the cone elements 12 may be appropriately sized for various diameter conduits or pipes.

The exterior of the cone 12 is preferably made of leather or canvas, or the like. This includes the rear end wall 28 as well as the covering for the forward portion 14 and the rear portion 20 and skirt 22. The canvas and leather provide better seals for the conduit or pipe 2 in which the apparatus is disclosed than other, impervious, materials such as vinyl, rubber, etc.

The cone 12 preferably has a greater diameter than a conduit that it will be proving so as to provide an effective seal for the air pressure that will propel it through the conduit. The pipe 2 is, for example, five inch I.D. pipe. The undeformed cone 12 may preferably have a maximum diameter at the maximum diameter portion 18 of about eight inches. The overall or axial length of the front part of the cone is preferably about eight inches, while the rear portion of the cone, between the maximum diameter area 18 and the end wall 28, is preferably about six inches in length.

The cord or rope elements 40 are preferably nylon, or some other relatively impervious material that has relatively good abrasion resistance properties, has relatively high strength, and is relatively impervious to moisture, etc.

The ring 42 is secured to one end of a plurality of links of a chain 44. The chain 44 is in turn secured to a cable clamp 46. The cable clamp 46 is in turn secured to a cable 48, best shown in FIG. 3. The cable 48 extends through the mandrel assembly 50 to a second cable clamp 84. The cable clamp 84 is in turn secured to a ring or eye 90. The cable or rope 92 is in turn secured to the eye 90.

The mandrel assembly 50 is made of a plurality of spacer elements and plate elements. The cable 48 extends through the spacers and plates. The plate elements are of varying diameters. Their purpose is to clean or remove any debris, rocks, etc. from the pipe or conduit as the mandrel assembly 50 is pulled through a conduit. A spacer 52 is disposed in front of a plate 54, between the clamp 46 and the plate 54. A spacer 56 is in turn disposed between the plate 54 and a plate 58. Another spacer 60 is disposed between the plate 56 and a plate 62. A spacer 64 is disposed between the plate 62 and a plate 66. A spacer 68 is disposed between the plate 66 and the plate 70. The diameters of the plates 62, 66, and 70 are preferably about the same size. The diameter of the plates 54 and 58 are substantially less than the diameter of the plates 62, 66, and 70. For example, the diameter of the plates 54 and 56 is preferably about two inches, and the diameter of the plates 62, 66, and 70 is about four and five-eights inches. That is, for proving a five inch pipe, the diameter of the plates 52, 58, and 62, 66, 70 is about two inches and four and five-eights inches, respectively.

Between the plate 70 and a plate 74 is a spacer 72. A spacer 76 is disposed between the plate 74 and a plate 78. A spacer 82 is disposed between the plate 78 and a plate 82. A spacer 84 is disposed between the plate 82 and the cable clamp 90.

For proving a nominal five inch pipe or conduit, such as the conduit or pipe 2, the diameter of the plates 74 and 78 is about three inches, while the diameter of the plate 82 is about two inches.

The diameters of the spacers 52, 56, 60, 64, 68, 72, 76, 80, and 84 are all sufficient to allow the cable 48 to extend through them without binding. The overall length of each of the spacers 52 . . . 84 is about one inch. It will be noted that the spacers 52 . . . 84 and their alternating plates 54, 58, 62, 66, 70, 74, 78, and 82 are relatively loosely secured together. Accordingly, the plates and their spacers need not maintain a substantially parallel alignment. Rather, the spacers and plates are loosely enough connected together so that the apparatus may negotiate curves, changes in diameter, etc., as required.

It will be noted that there is a substantial distance between the cone 12 and the elements of the mandrel assembly 50. This is required, again, due to any curves, etc., which may be found in pipes. In addition, if debris is found in a pipe over a relatively long distance, the debris may accumulate between the cone 12 and the various plates 54 . . . 82. There accordingly must be space between the elements to allow for such contingencies. The debris may be of any variable type, such as pebbles, sand, rocks, or the like, which may accumulate during pipe installation, or which may thereafter be moved into the pipe by any of a variety of mechanisms. For example, rock slides, rain, etc., may cause debris to be flushed into, or fall into, an open pipe or conduit. In addition, particularly with plastic pipe, a portion of the pipe may be broken or collapsed due to faulty design, incorrect installation, etc. In such cases, the apparatus 10 may or may not move through the pipe. If a break or crack is slight, then the apparatus 10 may move through the pipe, and the debris within the pipe that is flushed out by the apparatus 12 may show the problem within the pipe.

The cone 12 and the mandrel assembly 50 is moved through the pipe or conduit 2 by means of air pressure from a pressurized source or compressor (not shown). The pressurized air is introduced into the conduit 2 through the cap 100.

The cap 100 includes a generally cylindrical portion 102, the inside diameter of which is substantially the same as the outside diameter of the pipe or conduit 2 to which the cap 100 is to be secured. Within the cylindrical portion 102 are two bores, including a bore 104 and a bore 108. A shoulder 106 is disposed between the bores 104 and 108. The bore 104 has an inside diameter which is substantially the same as the outer diameter of the pipe 2, while the diameter of the bore 108 is slightly less than that of the bore 104. The shoulder 106 is a radially extending shoulder, and an O-ring 120 is disposed on the shoulder 106. As shown in FIG. 4, the O-ring 120 presses against the end 4 of the pipe or conduit 2 to help seal the cap 100 to the pipe or conduit 2.

Secured to the cylindrical portion 102 is an integral end wall 110. A threaded aperture 112 is centrally disposed in the end wall 110. The pneumatic control and cable fitting 130 is appropriately secured to the threaded aperture 112. The pneumatic control and cable fitting 130 includes a nipple portion 132 which has exterior threads to mate with the threads of the aperture 112. Extending rearwardly from the nipple portion 132 is a Y adapter 134. The Y adapter 134 includes an air arm 142 extending outwardly from the adapter 134. Extending rearwardly from the adapter 134 is a rear nipple portion 136 to which is secured a rope guide 138. The rope guide 138 includes an outwardly flaring rear portion 140 through which the rope or cable 92 extends. It will be noted that the adapter 134, its nipple portions 132 and 136, and the rope guide 138 are all aligned so that the cable or rope 92 extends into the pipe 2 in a relatively straight line.

The air arm 142 extends outwardly at an acute angle from the adapter portion 134. A valve 144 is secured to the air arm 142, and a valve actuating lever 146 extends upwardly from the valve 144. A pressure gauge 148 is disposed on the arm 142 downstream from the valve 144. Upstream from the valve 144 is an airline 150, which is appropriately secured to the valve 144. In turn, the airline 150 extends to a compressor, or the like, as discussed above (not shown).

In operation, the cone 12 and the mandrel assembly 50 are disposed within the bore of a conduit or pipe 2. The cap 100 is then disposed on the end of the pipe or conduit 2. There is a slip fit and frictional engagement only between the cap 100 and the pipe or conduit 2.

The valve 144 is opened to allow air pressure to build up within the pipe or conduit 2 in order to move the cone 12 and the mandrel assembly 50, and the cable or rope 92, through the pipe 2.

As the cone 12 and the mandrel assembly 50 move through the pipe or conduit 2, the cable 92 is fed through the guide 138, the adapter 134, and through the end cap 100 and into the conduit 2, as required.

As indicated above, the cone 12 is flexible enough to allow it to deform to conform to the interior configuration or changed diameter of the conduit 2, as required, within reason. As also indicated, the size, including the diameter, of the cone 12 is preferably configured for the particular diameter of pipe or conduit with which it will be used. Similarly, the diameters of the circular plates 54 . . . 82 will be selected appropriately for the diameter of pipe or conduit with which they will be used.

For slight amounts of debris within the pipes, the prover apparatus 10 will enable the pipe or conduit to be cleaned by dragging or pushing the debris along as the cone 10 and the mandrel assembly 50 moves through the conduit. Once the cone 12 and the mandrel assembly 50 are pushed through the pipe or conduit, there will be a sudden drop in the air pressure registering on the gauge 148. In addition, if there are workmen on the other end of the pipe or conduit 2, they will receive the cone 12 in the mandrel assembly 50. At such time, the actuating lever 146 will be released to stop the pressure.

The cable or rope 92 is of sufficient strength to allow virtually any desirable element or elements to be connected to it to be pulled through the pipe or conduit without the need for sending through different diameters or weight or materials, as discussed above in the "Background of the Invention" portion of the specification. The apparatus 10 accordingly will do any single step which has heretofore been done in a multitude of steps.

If there is a major problem in the pipe or conduit 2, the cone 12 will not pass, and the apparatus will cease to move. By marking the cable 92 at the guide 140, and then withdrawing the cable 92, and then by measuring the distance between the marking on the cable or rope 92 to the cone 12, the specific distance along the pipe or conduit at which the damage or debris occurs may be readily determined. Appropriate steps may then be taken to overcome the problem or problems. In this manner, the integrity of a pipe or conduit may be proved, and at the same time cleaned, by the apparatus 10.

The cone 12 essentially acts as a flexible piston movable in a conduit in response to air pressure. The cone 12, or piston, is able to deform due to its flexible construction. The cone 12 is thus able to move past slight obstructions, and in some cases to push the obstructions ahead of it, and is able to move around curves, etc., along a conduit.

The mandrel assembly 50 acts as a plurality of separate cleaning elements of various sizes to help move obstructions, debris, etc., through the pipe or conduit behind the cone or piston 12. The spacer elements keep the plates separate from each other and provide the flexibility to allow the plate elements to move, as acquired, also with respect to debris, etc., and also with respect to curves.

It will be noted that the rope or cable 92 extends through the adapter 134 and the guide 138 as it moves into the conduit 2. The diameter of the rope guide 138 is about the same as the diameter of the rope or cable, so that a substantial amount of air pressure is not lost through the rope guide 138. However, it will be obvious that, if the fit between the rope or cable 92 and the guide 138 is snug, it will be difficult to move the rope freely. That is, a substantial drag will be imposed on the rope or cable 92 which will in turn hamper the movement of the cone 12 and the mandrel assembly 50.

There will be some air pressure lost through the rope guide 138. Such loss will, however, be relatively small in comparison with the amount of pressure within the conduit 2 behind the cone of piston 12. Accordingly, the air pressure behind the cone 12 urges the cone 12 and the mandrel assembly 50 through the conduit 2, and the rope 92 follows.

The use of the plurality of rope elements 40 allows the ring 42 and the chain 44 to be centrally located with respect to the conduit 2. With the eyelets 24 spaced apart about the periphery of the skirt portion 22 of the cone 12, there is generally an even pull on each of the rope elements 40 which helps to center the eye 42 and accordingly to center the chain 44, the cable clamp 46, and the cable 48 and the various spacer elements 52 . . . 80 and the intermediate circular plates 54 . . . 82. This, in turn, minimizes the frictional engagement between the cone 12 and the mandrel assembly 50 with respect to the conduit 2, and accordingly maximizes the functioning of the apparatus 10 with respect to the conduit 2.

It will be understood that with only a slip type fit between the conduit 2 and the cap 100, the cap 100 will tend to come off the conduit 2 if the cone 12 stops moving due to a substantial blockage within the conduit 2. As long as the cone 12 is moving through the conduit 2, the pressure differential around the piston, that is, the difference between the pressure in front of the cone 12 and the pressure behind the cone 12, causes the cone 12 to continue moving through the conduit unless a substantial obstruction prevents its movement.

A safety ring 160 is disposed about the conduit 2 and is connected to the cap 100. The ring 160 prevents the cap from inadvertently accidentally blowing off during the proving operations. The ring 160 includes an aperture 102 which is slightly greater than the outer diameter of the conduit 2. The ring 160 is placed on the conduit 2 before the cap 100 is placed on the end of the conduit.

The ring 160 includes a tab 164. One end of a relatively short connector line 166 is secured to the tab 164. The other end of the connector line 166 is secured to a fastening tab 168. The fastening tab 168 is secured to the cap 100 by a screw 170.

In operation, as the cap 100 moves rearwardly with respect to the conduit 2, as from an increase in pressure within the conduit 2 due to the stoppage of the cone or piston 12, the safety ring 160 will move slightly. The movement of the ring 160 will be a cocking movement caused by the pull of the line 166 on the tab 164. The tab 164 will move slightly until the cocking of the ring 160 on the conduit 2 prevents further movement. The ring 160 is thus locked on the conduit 2 by a frictional engagement.

In the event that pressure within the conduit 2 increases sufficiently to cause the cap 100 to move, due to some type of blockage within the conduit, the excess pressure is vented around the cone or piston 12. Since the cone 12 is flexible and not solid, it simply collapses or distorts sufficiently to relieve excess pressure. In this manner, dangerous pressures are avoided. However, it is obvious that an operator should observe the stoppage of rope 92 into the rope guide 138 long before excess pressure can build up.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Air driven apparatus for proving and cleaning a conduit, comprising, in combination:
    flexible piston means movable in the conduit;
    flexible mandrel means secured to and movable with the piston means in the conduit including
       cable means secured to the piston means,
       a plurality of spacers secured to and movable with the cable means,
       a plurality of plates alternating with the plurality of spacers and secured to and movable with the cable means;
    rope means secured to the cable means of the mandrel means and movable with the piston means and the mandrel means through the conduit; and
    air means for moving the piston means, the mandrel means, and the rope means through the conduit to prove the integrity of the conduit.

2. The apparatus of claim 1 in which the air means includes cap means for sealing the conduit to allow the conduit to be pressurized to move the piston means, the mandrel means, and the rope means within the conduit.

3. The apparatus of claim 2 in which the air means further includes a fitting secured to the cap means, a rope guide through which the rope means moves, and a valve for controlling the flow of air through the fitting and into the conduit.

4. The apparatus of claim 3 in which the cap means includes a cap securable to the conduit, an aperture extending through the cap for securing the fitting to the cap, and sealing means for sealing the cap and the conduit.

5. The apparatus of claim 4 in which the cap means further includes safety ring means disposed about the conduit and secured to the cap to prevent the cap from inadvertently coming off the conduit.

6. The apparatus of claim 1 in which the piston means includes a flexible cone.

7. The apparatus of claim 6 in which the piston means further includes a skirt and a plurality of rope elements secured to the skirt and extending to the mandrel means for providing a symetrical connection for securing the flexible cone to the mandrel means.

8. The apparatus of claim 6 in which the piston means further includes foam means disposed within the flexible cone to allow the flexible cone to deform as the piston means moves in the conduit and to allow the piston means to maintain a sealing relationship with the conduit.

9. The apparatus of claim 1 in which the plurality of plates includes a plurality of circular plates.

10. The apparatus of claim 9 in which the diameters of at least some of the plates of the plurality of plates varies.

11. The apparatus of claim 10 in which the cable means includes a ring to which the piston means is secured, a cable extending through the plurality of spacers and the plurality of plates, a chain extending between the ring and the cable, and the rope means is secured to the cable remotely from the chain.

* * * * *